Figure 1:
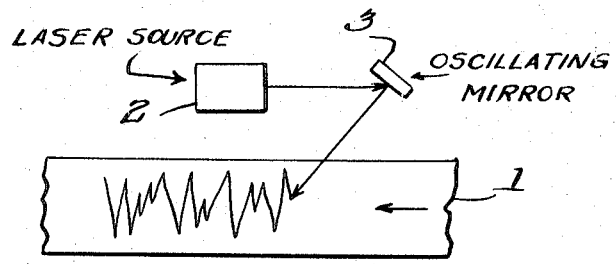

United States Patent Office 3,348,233
Patented Oct. 17, 1967

3,348,233
LASER OSCILLOGRAPH
Hellmuth Hertz, Slattervagen 27 F, Lund, Sweden
Filed July 10, 1963, Ser. No. 294,039
Claims priority, application Germany, Aug. 14, 1962,
H 46,644
5 Claims. (Cl. 346—76)

The invention disclosed herein is concerned with a light beam oscillograph employing as a light source a so called "laser," that is, a molecular amplifier for producing electromagnetic radiation in the optical wave length range. The term "laser" is an acronym for "Light Amplification by Stimulated Emission of Radiation."

Previously known light beam oscillographs operate with a light beam which is by an optical system directed onto a mirror which is secured on a magnetic system represented by a galvanometer movement suspended for oscillation responsive to current flowing in the galvanometer coil, thus deflecting the mirror and therewith the light spot with respect to a film or sensitized paper moving in a direction perpendicular to the motion of the deflected light beam, thereby producing a continuous record of the current in the coil.

It is desirable, in connection with many investigations undertaken with the aid of light beam oscillographs, to immediately obtain in durable form the record of the investigated phenomena. However, the sensitized paper which is generally used for oscillographic recording of rapidly varying quantities as a function of time, must be developed before it can be evaluated. While devices have been designed for automatically effecting the developing, some time, in the order of magnitude of seconds, always elapses until the finished oscillogram is obtained.

Directly tracing light beam oscillographs have also been developed, which produce, with the aid of ultraviolet light, instantly readable records upon a paper which is sensitive to the corresponding part of thespectrum. However, such oscillographs are greatly limited so far as the tracing speed is concerned, which is due to inertia of the record paper with respect to the light-sensitivity thereof, thereby imposing limitations on the paper feed and thus on the resolution as to time, and also requiring that the deflection speed of the magnetic system be kept within rather narrow limits. The tracing speed which is given by the upper limit frequency of the movable system cannot be utilized at all with the previously known light beam oscillographs of this kind.

The invention eliminates the above indicated drawbacks by the provision of a light beam oscillograph in which a laser is used as a source of light.

A light amplifier of this kind is adapted to produce light rays of exceptionally great intensity. The light beam produced in a laser emanates as a coherent plane wave at a very small space angle. Very high localized energy densities can be obtained with such a light beam due to the concentrated focusing thereof. The laser light can in principle be collected, by optical means, at a focal point with a size in the order of magnitude of the length of a light wave.

The various features and objects of the invention will now be described with reference to the accompanying drawing showing in purely diagrammatic manner embodiments thereof.

Figure 2:
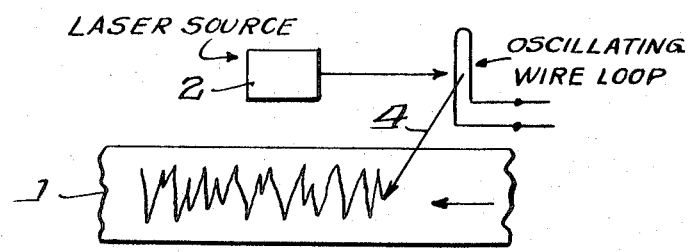
Figure 3:
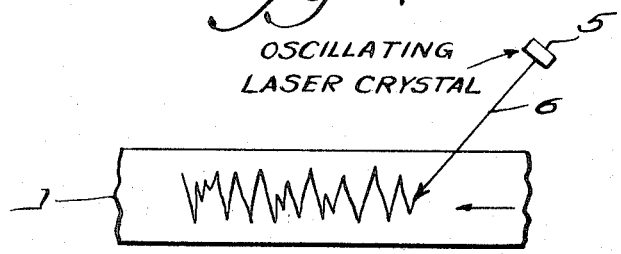

FIG. 1 shows an embodiment employing a laser beam in connection with an oscillating mirror;

FIG. 2 indicates an embodiment employing a laser beam in connection with an oscillating wire loop; and FIG. 3 shows an embodiment employing an oscillating laser crystal.

In FIG. 1, numeral 1 indicates a paper strip which is by suitable known means moved in the direction indicated by the arrow. Numeral 2 represents a laser light source the beam of which is trained upon an oscillating mirror 3 which forms part of the moving system. The mirror deflects the beam onto the paper strip 1 to trace thereon the desired record.

The intensive radiation sufficient to produce upon an unprepared paper a very well recognizable burn trace.

It is also feasible to trace upon the customary photographic recording paper and to make the mirror 3 as small as is made possible by the concentrated focusing of the laser beam. The mass of the mirror represents, particularly in the case of loop oscillographs, an important factor which determines the upper limit frequency of the movable system. A considerably higher limit frequency can be obtained upon making this mirror very much smaller, as is made possible by the concentrated focusing of the laser beam. Accordingly, such a light beam oscillograph is adapted to record rapidly occurring quantities with great resolution as to time.

Another embodiment of the invention which is schematically indicated in FIG. 2, is based upon the phenomenon of producing diffracted images of closely spaced apart gaps or wires, by illumination from a coherent light source. The diffraction images will be particularly luminous upon using a laser 2 as a coherent light source. The diffracted light beam which produces the diffraction images can be utilized as a pencil of light 4 which traces a durable record upon a light sensitive recording medium 1 moving relative to the light beam, especially upon employing for the diffraction the two parallel wires of the current conducting loop of the oscillating system. A diffraction image will be produced at the two parallel wires upon radiating the light of a coherent light source in a direction extending perpendicularly to the plane defined by wires. The position of this diffraction image depends largely on the spacing between the wires. A rotation of the oscillograph loop causes a shifting of the diffraction image, which can be recorded. The diffracted light beam 4 can if desired be concentrated to a focal point on the recording medium.

Accordingly, the loop oscillograph described in the preceding paragraph and schematically shown in FIG. 2, operates without an oscillating mirror and therefore is adapted to record higher frequencies than can be recorded with customary oscillating loops provided with mirrors.

As indicated in FIG. 3, it is also feasible to use a crystal 5 serving for the production of the laser beam as a light source in an oscillating system, and to utilize the emanating light beam 6 as a tracer to effect direct or photographic recording, without the use of a deflection mirror or additional optical focusing means.

Changes may be made within the scope and spirit of the appended claims which define what is believed to be new and desired to have protected by Letters Patent.

I claim:

1. In a light beam oscillograph, the combination of a movable recording medium comprising an unprepared paper, a laser light source operable to provide a light beam of susbtantially constant intensity, and an oscillating system, responsive to the criteria to be recorded, for training said light beam of constant intensity emanating from said laser onto said recording medium to trace a record thereon, in the form of a burn trace, as a function of the position of the light beam on said recording medium.

2. A light beam oscillograph according to claim 1, comprising optical means, disposed in the path of the light beam, for concentrating the latter at a focal point with the diameter of a few light wave lengths.

3. A light beam oscillograph according to claim 1, wherein said oscillating system comprises a mirror having a diameter in the order of magnitude of a few light wave lengths.

4. A light beam oscillograph according to claim 1, wherein the oscillating system comprises a loop formed by spaced apart parallel disposed wires, means for training the coherent laser light onto said wires approximately perpendicularly to the plane formed thereby so as to produce a diffracted light beam which is utilized for tracing the desired record on said recording medium in accordance with the oscillating motion of said wire loop.

5. A light beam oscillograph according to claim 1, comprising a laser crystal arranged on the oscillating system, the light beam emanating from said crystal serving to trace the desired record.

References Cited
UNITED STATES PATENTS

| | | | |
|---|---|---|---|
| 1,597,487 | 8/1926 | St. Clair | 346—108 |
| 1,966,112 | 7/1934 | Blau | 324—97 |
| 2,067,696 | 1/1937 | Crampton | 346—109 X |
| 2,783,118 | 2/1957 | Owen | 346—109 |
| 3,154,371 | 10/1964 | Johnson | 346—108 |
| 3,175,196 | 3/1965 | Lee et al. | 346—75 X |

RICHARD B. WILKINSON, *Primary Examiner.*

L. W. SMILOW, *Examiner.*

J. W. HARTARY, *Assistant Examiner.*